United States Patent
Park et al.

(10) Patent No.: US 9,706,593 B2
(45) Date of Patent: Jul. 11, 2017

(54) METHOD FOR REPORTING BUFFER STATUS AND COMMUNICATION DEVICE THEREOF

(71) Applicant: LG ELECTRONICS INC., Seoul (KR)

(72) Inventors: Sungjun Park, Seoul (KR); Youngdae Lee, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 14/774,590

(22) PCT Filed: Jan. 9, 2014

(86) PCT No.: PCT/KR2014/000224
§ 371 (c)(1),
(2) Date: Sep. 10, 2015

(87) PCT Pub. No.: WO2014/163287
PCT Pub. Date: Oct. 9, 2014

(65) Prior Publication Data
US 2016/0044734 A1 Feb. 11, 2016

Related U.S. Application Data

(60) Provisional application No. 61/807,338, filed on Apr. 2, 2013.

(51) Int. Cl.
*H04W 76/02* (2009.01)
*H04W 56/00* (2009.01)
*H04L 5/00* (2006.01)
*H04W 72/04* (2009.01)
*H04W 72/14* (2009.01)
(Continued)

(52) U.S. Cl.
CPC ......... *H04W 76/025* (2013.01); *H04L 5/0032* (2013.01); *H04W 28/0278* (2013.01); *H04W 36/18* (2013.01); *H04W 56/0005* (2013.01); *H04W 72/0413* (2013.01);
(Continued)

(58) Field of Classification Search
CPC ........... H04W 76/025; H04W 28/0278; H04W 36/18; H04W 56/0005; H04W 72/14; H04W 72/0413; H04W 36/00; H04W 84/045; H04W 88/08; H04L 5/0032
See application file for complete search history.

(56) References Cited

U.S. PATENT DOCUMENTS

2005/0068963 A1 3/2005 Lee et al.
2005/0192021 A1 9/2005 Lee et al.
(Continued)

OTHER PUBLICATIONS

PCT International Application No. PCT/KR2014/000224, Written Opinion of the International Searching Authority dated Apr. 25, 2014, 1 page.
(Continued)

*Primary Examiner* — Ajay Cattungal
(74) *Attorney, Agent, or Firm* — Lee Hong Degerman Kang Waimey

(57) ABSTRACT

There is provided a method for a method for reporting buffer status. The method may comprise: identifying a change of a radio bearer; and triggering a buffer status report (BSR), if the change of the radio bearer is identified.

17 Claims, 19 Drawing Sheets

(51) Int. Cl.
*H04W 28/02* (2009.01)
*H04W 36/18* (2009.01)
*H04W 36/00* (2009.01)
*H04W 84/04* (2009.01)
*H04W 88/08* (2009.01)

(52) U.S. Cl.
CPC ............ *H04W 72/14* (2013.01); *H04W 36/00* (2013.01); *H04W 84/045* (2013.01); *H04W 88/08* (2013.01)

(56) References Cited

U.S. PATENT DOCUMENTS

| | | | |
|---|---|---|---|
| 2009/0303954 A1 | 12/2009 | Guo | |
| 2010/0189007 A1* | 7/2010 | Chun | H04W 8/26 370/252 |
| 2010/0281486 A1* | 11/2010 | Lu | H04W 72/1247 718/104 |
| 2010/0329135 A1 | 12/2010 | Pelletier et al. | |
| 2011/0280223 A1 | 11/2011 | Maeda et al. | |
| 2012/0163161 A1* | 6/2012 | Zhang | H04L 1/1874 370/216 |
| 2012/0163338 A1* | 6/2012 | Zhang | H04W 36/0083 370/331 |
| 2013/0028223 A1* | 1/2013 | Kim | H04L 5/0007 370/329 |
| 2013/0088983 A1 | 4/2013 | Pragada et al. | |
| 2013/0188580 A1* | 7/2013 | Dinan | H04W 52/281 370/329 |
| 2014/0177560 A1* | 6/2014 | Guo | H04W 72/1268 370/329 |
| 2014/0293896 A1* | 10/2014 | Kuo | H04W 72/0413 370/329 |
| 2015/0124743 A1* | 5/2015 | Damnjanovic | H04W 76/025 370/329 |
| 2015/0188680 A1* | 7/2015 | Li | H04W 28/08 370/329 |

OTHER PUBLICATIONS

3rd Generation Partnership Project, "Technical Specification Group Radio Access Network; Evolved Universal Terrestrial Radio Access (E-UTRA); Medium Access Control (MAC) protocol specification (Release 11)", 3GPP TS 36.321 V11.2.0, Mar. 2013, 56 pages.

Research in Motion, UK Limited, "Discussion on Protocol Stack Support in Small Cell eNB", 3GPP TSG RAN WG2 Meeting #81, R2-130068, Jan. 18, 2013, 7 pages.

U.S. Appl. No. 14/652,750, Office Action dated Sep. 27, 2016, 11 pages.

U.S. Appl. No. 14/774,076, Office Action dated Nov. 10, 2016, 7 pages.

\* cited by examiner

— · — Backhaul link within cluster

— ·· — Backhaul link between small cells and macro cell

— · — Backhaul link within cluster
— · · — Backhaul link between small cells and macro cell — · — Backhaul link within cluster
— · · — Backhaul link between small cells and macro cell — · — Backhaul link within cluster

METHOD FOR REPORTING BUFFER STATUS AND COMMUNICATION DEVICE THEREOF

CROSS-REFERENCE TO RELATED APPLICATIONS

This application is the National Stage filing under 35 U.S.C. 371 of International Application No. PCT/KR2014/000224, filed on Jan. 9, 2014, which claims the benefit of U.S. Provisional Application No. 61/807,338, filed on Apr. 2, 2013, the contents of which are all hereby incorporated by reference herein in their entirety.

BACKGROUND OF THE INVENTION

Field of the Invention

The present invention relates to wireless communication, and more specifically, to a method for reporting buffer status and a communication device thereof.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Examples of techniques employed in the 3GPP LTE-A include carrier aggregation.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells. That is, the plurality of serving cells provides a user equipment with various services.

In recent, there is a discussion for adopting small cells.

SUMMARY OF THE INVENTION

In the related art as above explained, due to adoption of the small cells, it will be possible for the UE to have dual connectivities to both a conventional cell and a small cell. However, there is yet no concept and technique to realize dual connectivities.

Therefore, an object of the present invention is to provide solutions to realize dual connectivities.

To achieve these and other advantages and in accordance with the purpose of the present invention, as embodied and broadly described herein, there is provided a method for reporting buffer status. The method may comprise: identifying a change of a radio bearer; and triggering a buffer status report (BSR), if the change of the radio bearer is identified.

The method may further comprise connecting with a first base station via a first MAC entity; and connecting with a second base station via a second MAC entity.

The radio bearer may be served by the first MAC entity. Here, the identifying the change of radio bearer may comprise identifying whether the radio bearer is changed to be served by the second MAC entity or to be served by both the first and second MAC entities. Alternatively, the radio bearer may served by both the first and second MAC entities. Here, the identifying the change of radio bearer may comprise: identifying whether the radio bearer is changed to be served by the second MAC entity.

The triggering the BSR may comprise: triggering, by the second MAC entity, a BSR. The BSR may be for the second base station.

Alternatively, the triggering the BSR may further comprise: triggering, by the first MAC entity, a BSR. The BSR may be for the first base station.

The connecting with the first base station may include: connecting, by the first MAC entity, with a first cell of the first base station; and connecting, by the first MAC entity, with a second cell of the first base station.

The connecting with the second base station may include: connecting, by the second MAC entity, with a first cell of the second base station; and connecting, by the second MAC entity, with a second cell of the second base station.

If the first base station operates a plurality of cells, the first MAC entity may handle the plurality of cells. Also, if the second base station operates a plurality of cells, the second MAC entity may handle the plurality of cells.

To achieve these and other advantages and in accordance with the purpose of the present invention, as embodied and broadly described herein, there is also provided a communication device configured for reporting buffer status. The communication device may comprise: a radio frequency (RF) unit; and a processor connected with the RF unit thereby to control to: identify a change of a radio bearer; and trigger a buffer status report (BSR), if the change of the radio bearer is identified.

According to the present specification, the above-explained problem may be solved. Also, in a case where any radio bearer or any connectivity is changed, the one embodiment immediately triggers the BSR, thereby to solve a problem of a delay of the BSR.

DESCRIPTION OF EXEMPLARY EMBODIMENTS

Figure 1:
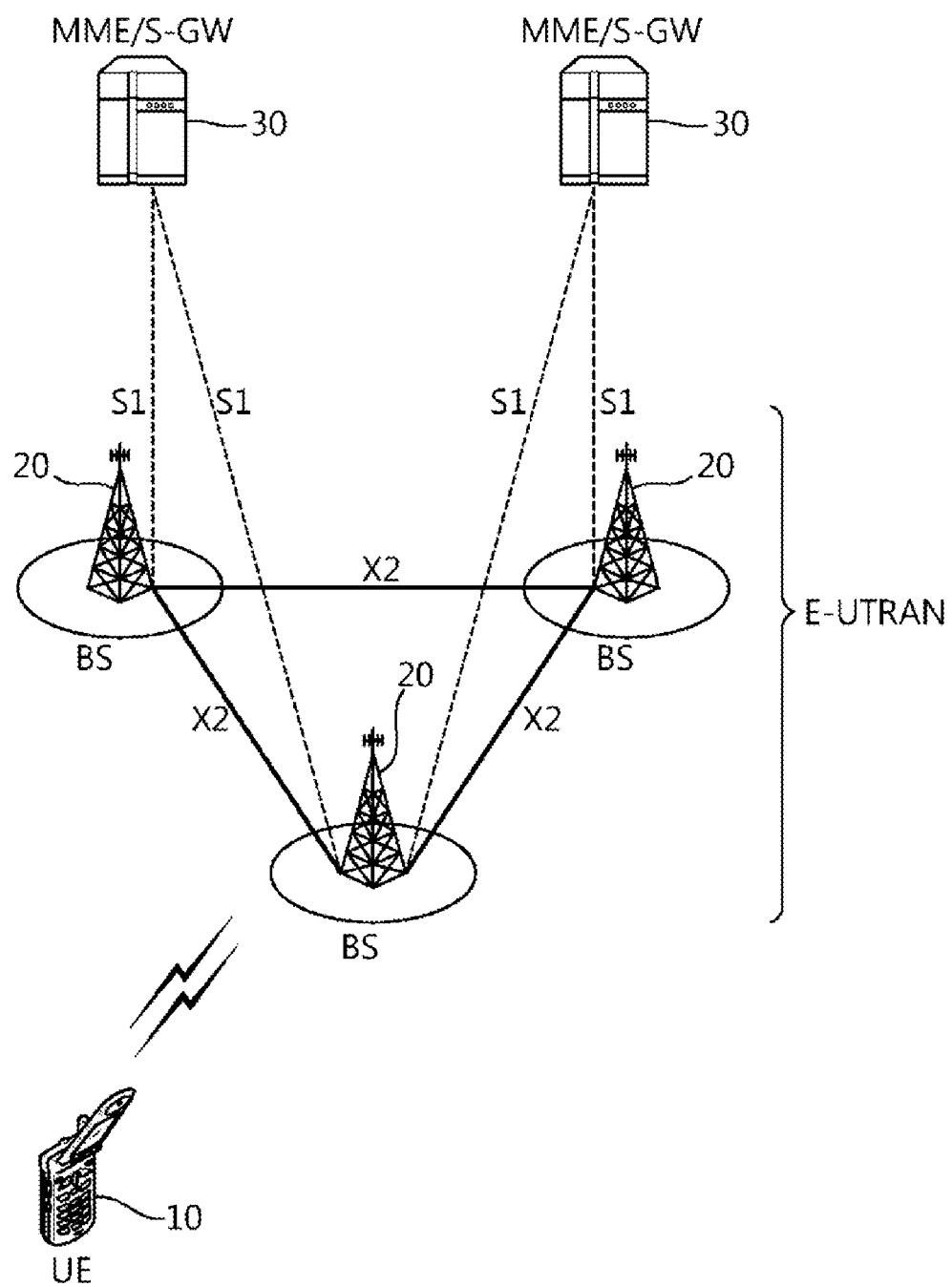
FIG. 1 shows a wireless communication system to which the present invention is applied.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed there between. On the contrary, in case where an element is "directly connected" or "directly linked" to another element, it should be understood that any other element is not existed there between.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary UE (User Equipment) in accompanying drawings, however the UE may be referred to as terms such as a terminal, a mobile equipment (ME), a mobile station (MS), a user terminal (UT), a subscriber station (SS), a wireless device (WD), a handheld device (HD), an access terminal (AT), and etc. And, the UE may be implemented as a portable device such as a notebook, a mobile phone, a PDA, a smart phone, a multimedia device, etc., or as an unportable device such as a PC or a vehicle-mounted device.

FIG. 1 shows a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNodeB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
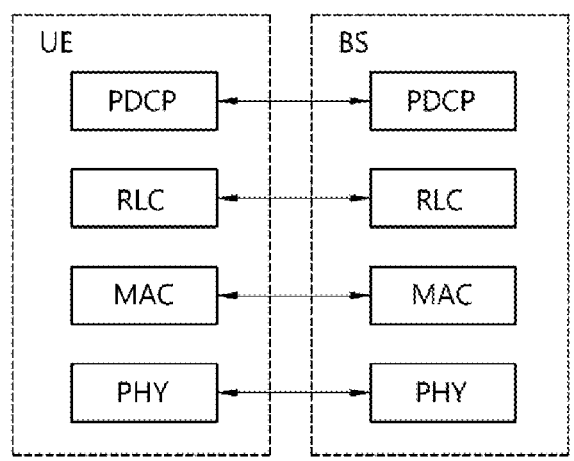
FIG. 2 is a diagram showing a radio protocol architecture for a user plane.
Figure 3:
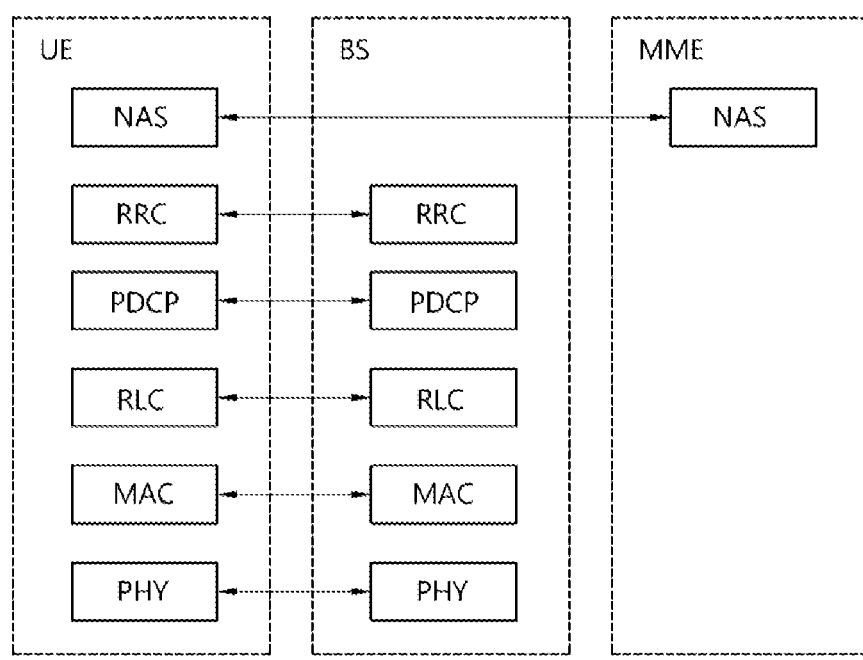
FIG. 3 is a diagram showing a radio protocol architecture for a control plane.

FIG. 2 is a diagram showing a radio protocol architecture for a user plane. FIG. 3 is a diagram showing a radio protocol architecture for a control plane.

The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 4:
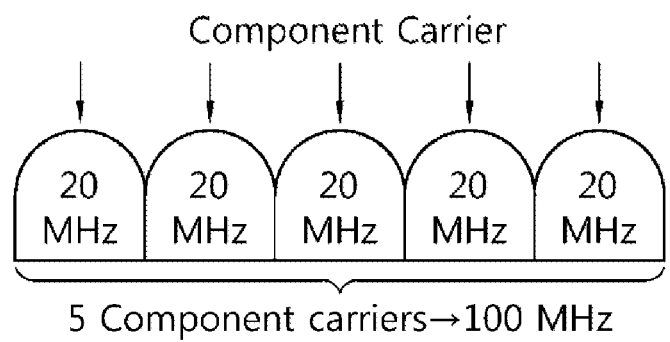
FIG. 4 shows an example of a wideband system using carrier aggregation for 3GPP LTE-A.

FIG. 4 shows an example of a wideband system using carrier aggregation for 3GPP LTE-A.

Referring to FIG. 4, each CC has a bandwidth of 20 MHz, which is a bandwidth of the 3GPP LTE. Up to 5 CCs may be aggregated, so maximum bandwidth of 100 MHz may be configured.

Figure 5:
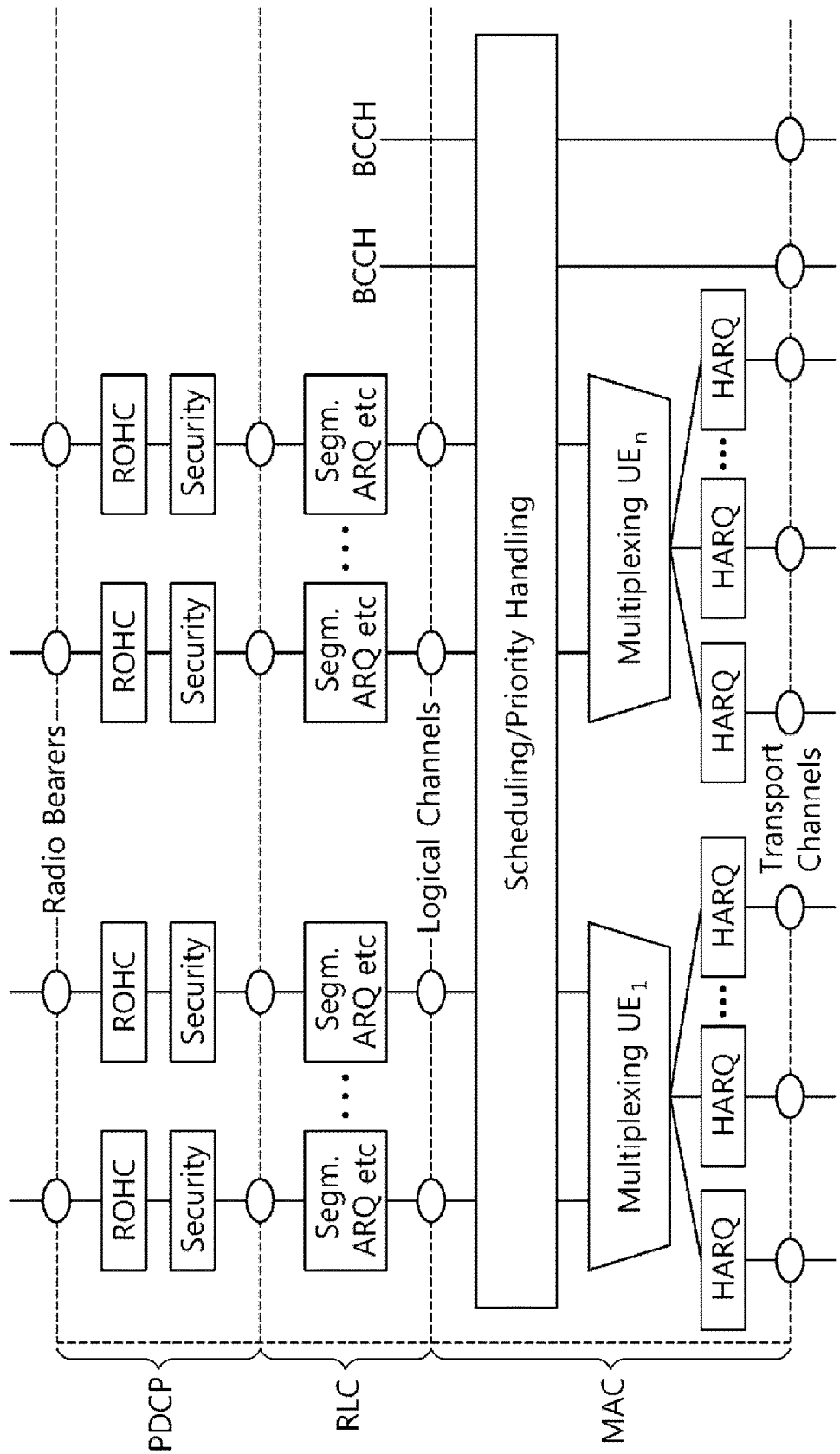
FIG. 5 shows an example of a structure of DL layer 2 when carrier aggregation is used.
Figure 6:
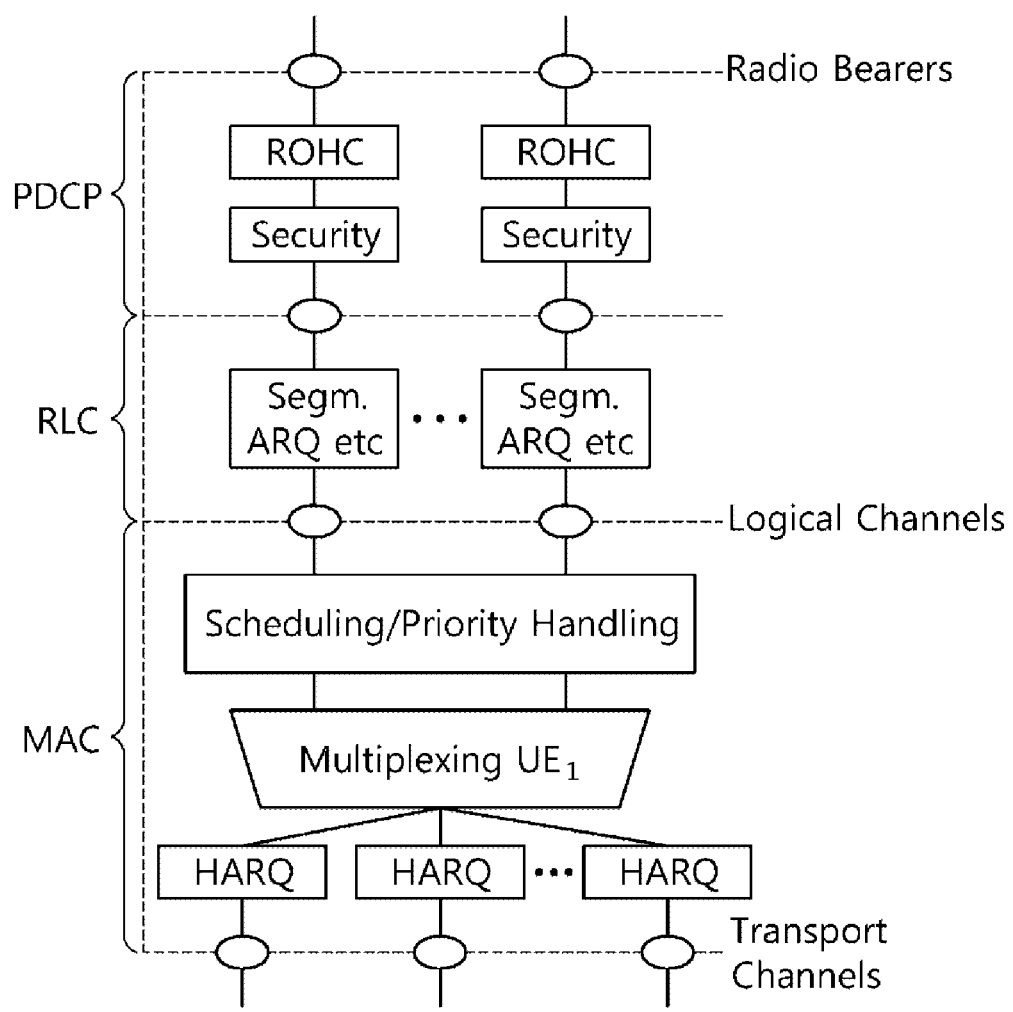
FIG. 6 shows an example of a structure of UL layer 2 when carrier aggregation is used.

FIG. 5 shows an example of a structure of DL layer 2 when carrier aggregation is used. FIG. 6 shows an example of a structure of UL layer 2 when carrier aggregation is used.

The carrier aggregation may affect a MAC layer of the L2. For example, since the carrier aggregation uses a plurality of CCs, and each hybrid automatic repeat request (HARQ) entity manages each CC, the MAC layer of the 3GPP LTE-A using the carrier aggregation shall perform operations related to a plurality of HARQ entities. In addition, each HARQ entity processes a transport block independently. Therefore, when the carrier aggregation is used, a plurality of transport blocks may be transmitted or received at the same time through a plurality of CCs.

<Buffer Status Reporting (BSR)>

Now, a buffer status reporting (BSR) will be described below. It may be referred to Section 5.4.5 of 3GPP TS 36.321 V10.5.0 (2012-03).

A BSR procedure is used to provide a serving eNB with information about an amount of data available for transmission in UL buffers of a UE.

In other word, the serving eNB needs to know a type of data and an amount of data which each user wants to transmit for using uplink radio resources efficiently. For downlink radio resources, the serving eNB can know an amount of data need to be transmitted to each user through downlink, since the data to be transmitted through the downlink is transferred from an access gateway to the serving eNB. On the other hand, for uplink radio resources, if a UE does not inform the serving eNB information on data to be transmitted through uplink, the serving eNB cannot know how much uplink radio resources are required for each UE. Therefore, for the serving eNB to allocate uplink radio resources to a UE properly, the UE is required to provide information for scheduling the uplink radio resources to the serving eNB.

Accordingly, if there is data to be transmitted to the serving eNB, a UE inform the serving eNB that the UE has the data to be transmitted to the BS, and the BS allocates proper uplink radio resources to the UE based on the information. This procedure is called a buffer status reporting (BSR) procedure.

A UE needs uplink radio resources for transmitting a BSR to the serving eNB. If the UE has allocated uplink radio resources when the BSR is triggered, the UE immediately transmits the BSR to the serving eNB using the allocated uplink radio resources. If the UE does not have allocated uplink radio resources when the BSR is triggered, the UE performs a scheduling request (SR) procedure for receiving uplink radio resources from the serving eNB.

For the BSR procedure, the UE considers all radio bearers which are not suspended and may consider radio bearers which are suspended.

The BSR is triggered if any predefined event occurs. According to its event, the BSR can be classified as three types: regular BSR, padding BSR and periodic BSR.

A regular BSR may be triggered if uplink data, for a logical channel which belongs to a logical channel group (LCG), becomes available for transmission in the RLC entity or in the PDCP entity. The definition of what data are considered as available for transmission is specified in section 4.5 of 3GPP TS 36.322 V9.1.0 (2010-03) and section 4.5 of 3GPP TS 36.323 V9.0.0 (2009-12), respectively. The regular BSR may be triggered if the data belongs to a logical channel with higher priority than the priorities of the logical channels which belong to any LCG and for which data is already available for transmission. The regular BSR may also be triggered if there is no data available for transmission for any of the logical channels which belong to a LCG.

A padding BSR may be triggered if uplink resources are allocated and number of padding bits is equal to or larger than the size of the BSR MAC control element (CE) plus its subheader.

A regular BSR may be triggered if a retransmission BSR timer expires and the UE has data available for transmission for any of the logical channels which belong to a LCG.

A periodic BSR may be triggered if a periodic BSR timer expires.

Figure 7:
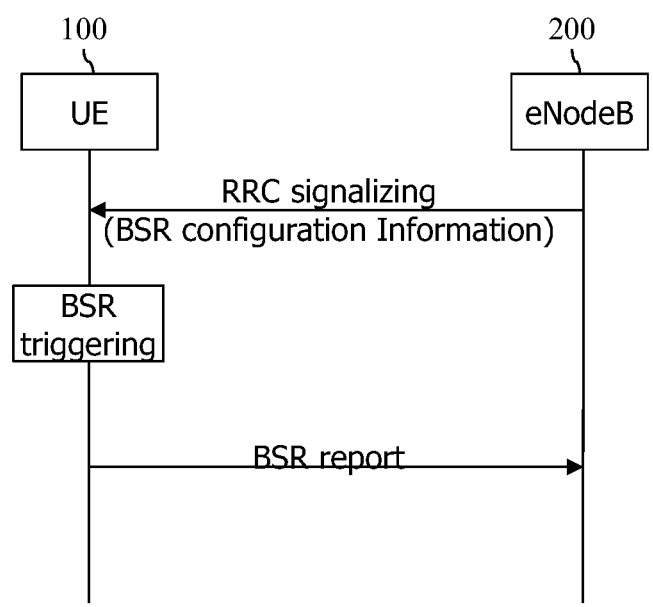
FIG. 7 is a view illustrating a procedure of a buffer status reporting.

FIG. 7 is a view illustrating a procedure of a buffer status reporting.

Referring to FIG. 7, an eNodeB 200 controls a BSR procedure associated with the logical channel in each UE through MAC-MainConfig signaling defined in the RRC layer. The RRC message includes information in a BSR periodic timer (periodicBSR-Timer) and/or a BSR re-transmission timer (retxBSR-Timer). Further, the RRC message includes configuration information associated with the format of BSR and data size.

At any time, the UE triggers a BSR.

A Buffer Status Report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

Based on the BSR triggering, the UE may transmit a BSR report. The BSR is configured in consideration of the configuration information established by RRC signaling.

Figure 8:
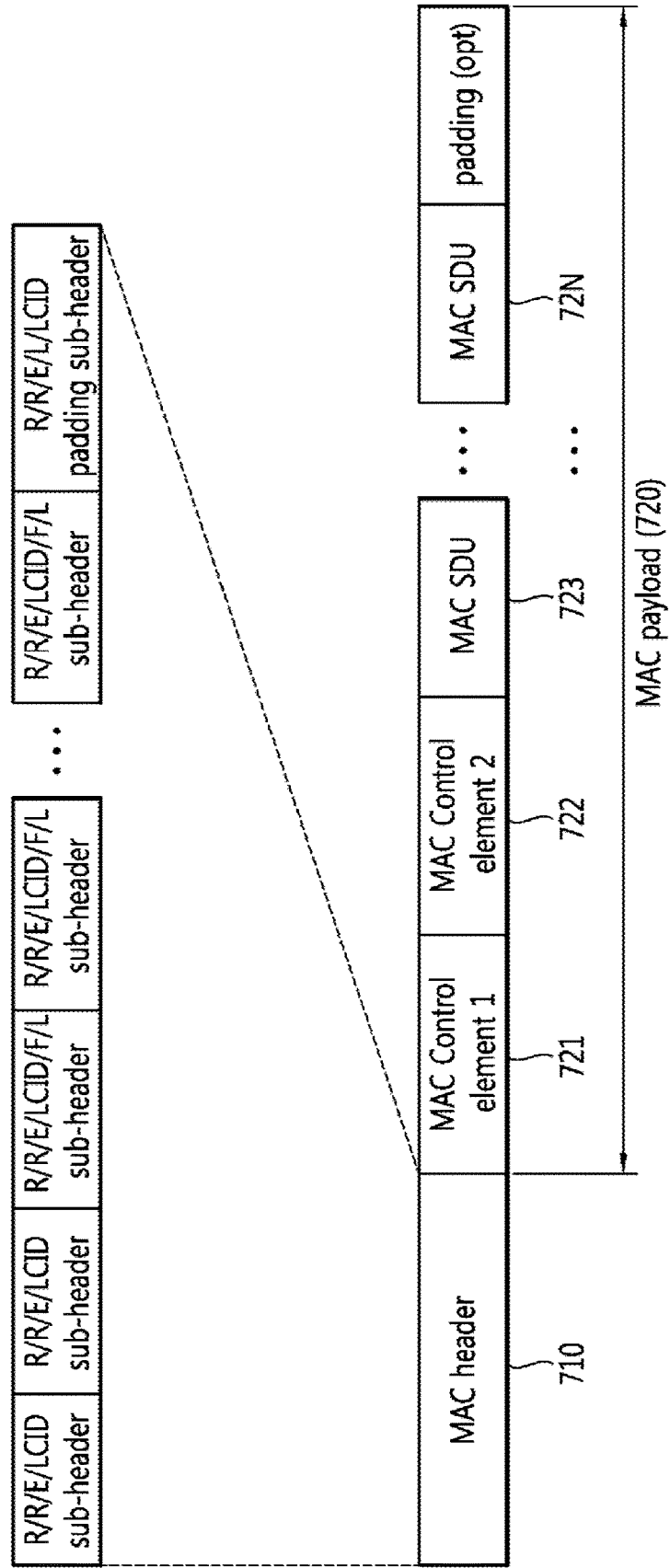
FIG. 8 is a view illustrating the architecture of a medium access control (MAC) message for BSR.

FIG. 8 is a view illustrating the architecture of a medium access control (MAC) message for BSR.

A MAC Protocol Data Unit (PDU) includes a MAC header 710, zero or more MAC control elements (CEs) 721 and 722, zero or more MAC service data units (SDUs) 723 and optionally padding bits. Both the MAC header 710 and the MAC SDUs 723 are of variable sizes. The MAC SDUs 723 is a data block provided from a higher layer (e.g., an RLC layer or an RRC layer) of a MAC layer. The MAC CE 721 or 722 is used to deliver control information of the MAC layer such as a BSR.

The MAC PDU header 710 includes one or more subheaders. Each subheader corresponds to either a MAC SDU, a MAC CE or padding bits.

The subheader includes six header fields R/R/E/LCID/F/L but for the last subheader in the MAC PDU and for fixed sized MAC CEs. The last subheader in the MAC PDU and subheaders for fixed sized MAC CEs include solely of the four header fields R/R/E/LCID. A subheader corresponding to the padding bits includes four header fields R/R/E/LCID.

Descriptions on each field are as follows.

R (1 bit): A reserved field.

E (1 bit): An extended field. It indicates whether there are F and L fields in a next field.

LCID (5 bit): A logical channel ID field. It indicates a type of the MAC CE or a specific logical channel to which the MAC SDU belongs.

F (1 bit): A format field. It indicates whether a next L field has a size of 7 bits or 15 bits.

L (7 or 15 bit): A length field. It indicates a length of the MAC CE or MAC SDU corresponding to the MAC sub-header.

The F and L fields are not included in a MAC sub-header corresponding to a fixed-sized MAC CE.

As shown in FIG. 8, the BSR is transmitted in a form of MAC signaling, and the BSR configured by the UE is identified by a setting value of the LCID (Logical Channel ID) of the MAC header 710. By way of example, in case the LCID value is set as 11101, this denotes that aBSR MAC CE 720 having a short BSR format is transmitted (refer to FIG. 9), and in case the LCID value is set as 11110, this denotes that a BSR MAC CE 720 having a long BSR format is transmitted (refer to FIG. 10). Accordingly, the base station may recognize the BSR format of the MAC CE through the LCID value of the MAC header.

Figure 9A:
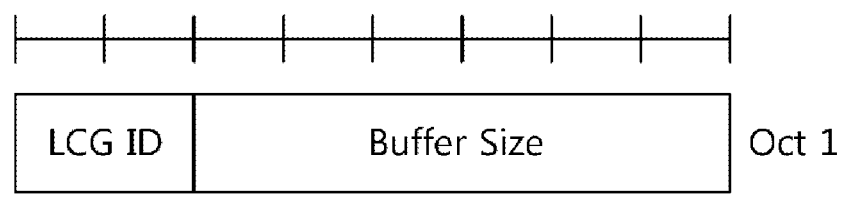
FIG. 9a is a view illustrating a Short BSR MAC Control Element to which the present invention applies.

FIG. 9a is a view illustrating a Short BSR MAC Control Element to which the present invention applies.

Referring to FIG. 9a, the Short BSR and Truncated BSR forma has one LCG ID field and one corresponding Buffer Size field. Herein LCG ID (The Logical Channel Group ID, 810) field identifies the group of logical channel(s) which UE buffer status is being reported. The length of the field is 2 bits. The Buffer Size (820) identifies the total amount of data available across all logical channels of the LCG, and the length of this field is 6 bits.

Figure 9B:
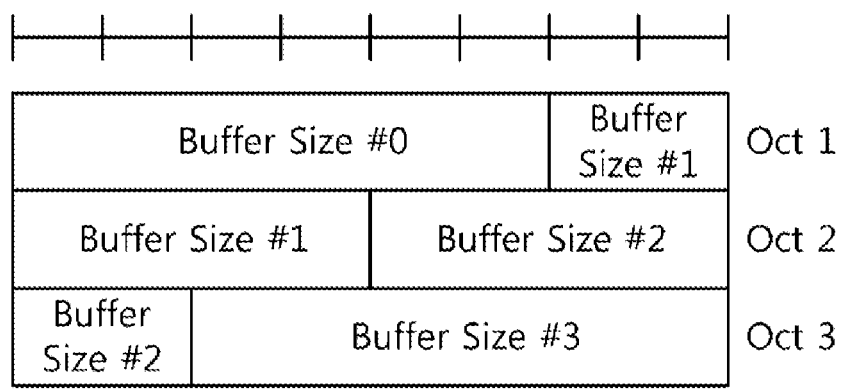
FIG. 9b is a view illustrating a Long BSR MAC Control Element to which the present invention applies.

FIG. 9b is a view illustrating a Long BSR MAC Control Element to which the present invention applies.

The long BSR includes the buffer amount (size) in the order from the logical channel group with LCG ID 0 (910) to the logical channel group with LCG ID 3 (940) without any logical channel group identifier. Here, one LCG includes one or more RBs, and the buffer size field value for the LCG is the total sum of data available for transmission in the RLC layer and the PDCP of all the RBs included in the LCG.

At this time, the data available for transmission in the PDCP and RLC layer may be defined as follows.

Data Available for Transmission in RLC

For the purpose of MAC buffer status reporting, the UE shall consider the following as data available for transmission in the RLC layer:

RLC SDUs, or segments thereof, that have not yet been included in an RLC data PDU;

RLC data PDUs, or portions thereof, that are pending for retransmission (RLC AM).

In addition, if a STATUS PDU has been triggered and the status prohibit timer is not running or has expired, the UE shall estimate the size of the STATUS PDU that will be transmitted in the next transmission opportunity, and consider this as data available for transmission in the RLC layer.

Data Available for Transmission in PDCP

For the purpose of MAC buffer status reporting, the UE shall consider PDCP Control PDUs, as well as the following as data available for transmission in the PDCP layer:

For SDUs for which no PDU has been submitted to lower layers:

the SDU itself, if the SDU has not yet been processed by PDCP, or the PDU if the SDU has been processed by PDCP.

In addition, for radio bearers that are mapped on RLC AM, if the PDCP entity has previously performed the re-establishment procedure, the UE shall also consider the following as data available for transmission in the PDCP layer:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received:

the SDU, if it has not yet been processed by PDCP, or the PDU once it has been processed by PDCP.

Here, the UE determines an index that is a value to be inserted into the buffer size field (6 bits) in consideration of 'extendedBSR-Sizes is configured/or not configured' with respect to the amount of data to be transmitted.

The buffer size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The length of this field is 6 bits. The values taken by the Buffer Size field are shown in Table 1.

TABLE 1

| Index | Buffer Size value [bytes] |
| --- | --- |
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |

TABLE 1-continued

| Index | Buffer Size value [bytes] |
|---|---|
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

According to Table 1, BSR can report the buffer size that is ranged from 0 to 150 kbytes or more than 150 kbytes.

<Small Cell>

Now, a concept of small cell will be described.

In the 3rd or 4th mobile communication system, an attempt to increase a cell capacity is continuously made in order to support a high-capacity service and a bidirectional service such as multimedia contents, streaming, and the like.

That is, as various large-capacity transmission technologies are required with development of communication and spread of multimedia technology, a method for increase a radio capacity includes a method of allocating more frequency resources, but there is a limit in allocating more frequency resources to a plurality of users with limited frequency resources.

An approach to use a high-frequency band and decrease a cell radius has been made in order to increase the cell capacity. When a small cell such as a pico cell or femto cell is adopted, a band higher than a frequency used in the existing cellular system may be used, and as a result, it is possible to transfer more information.

Figure 10:
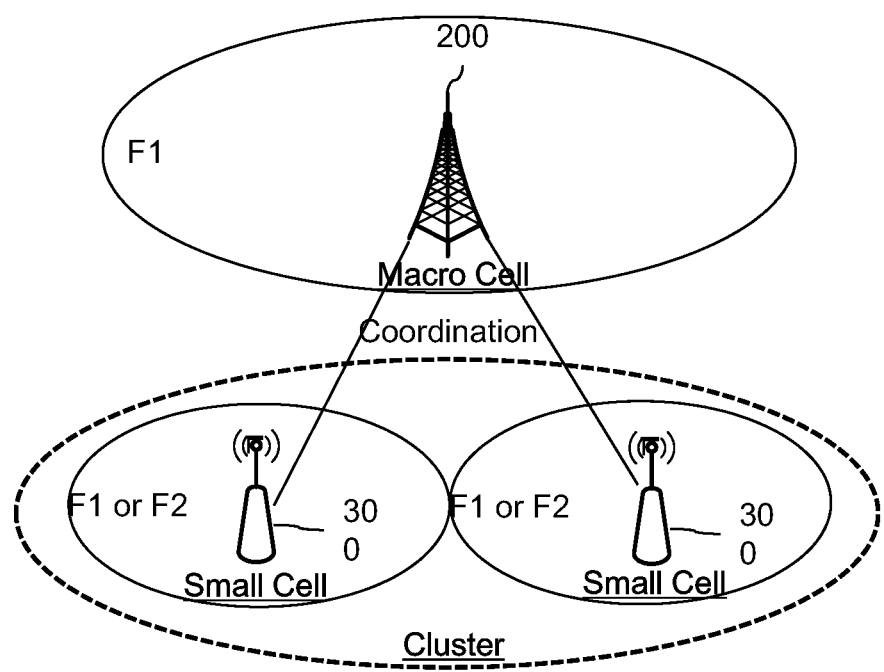
FIG. 10 shows one exemplary concept of coexistence of a macro cell and small cells.

FIG. 10 shows one exemplary concept of coexistence of a macro cell and small cells.

As shown in FIG. 10, a cell of a conventional BS or eNodeB (200) may be called as a macro cell over small cells.

Each small cell is operated by each small BS or eNodeB (300). When the conventional BS or eNodeB (200) may operate in use of a frequency F1, each small cell operates in use of a frequency F1 or F2. Small cells may be grouped in a cluster. It is noted that actual deployment of small cells are varied depending on operator's policy.

Figure 11:
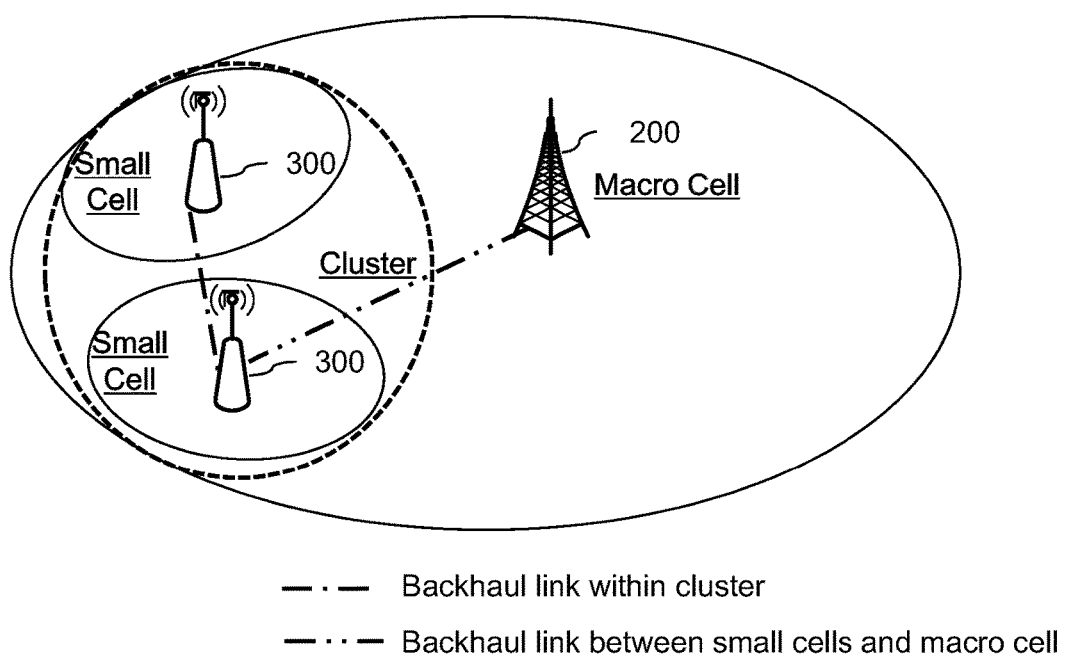
FIG. 11 shows one example of a first scenario of small cell deployment.

FIG. 11 shows one example of a first scenario of small cell deployment.

As shown in FIG. 11, the small cells may be deployed in the presence of an overlaid macro cell. That is, the small cells may be deployed in a coverage of the macro cell. In such deployment, the following may be considered.

Co-channel deployment of the macro cell and small cells
Outdoor small cell deployment
Small cell cluster is considered
The small cells are dense in cluster
Details regarding the number/density of small cells per cluster, backhaul link for coordination among small cells and time synchronization among small cells may also be considered
Both ideal backhaul and non-ideal backhaul may be also considered for the following interfaces: an interface between the small cells within the same cluster and an interface between a cluster of small cells and at least one macro eNodeB.

Non-ideal backhaul is assumed for all other interfaces.

Here, the non-ideal backhaul means that there may be a delay up to 60 ms.

Figure 12A:
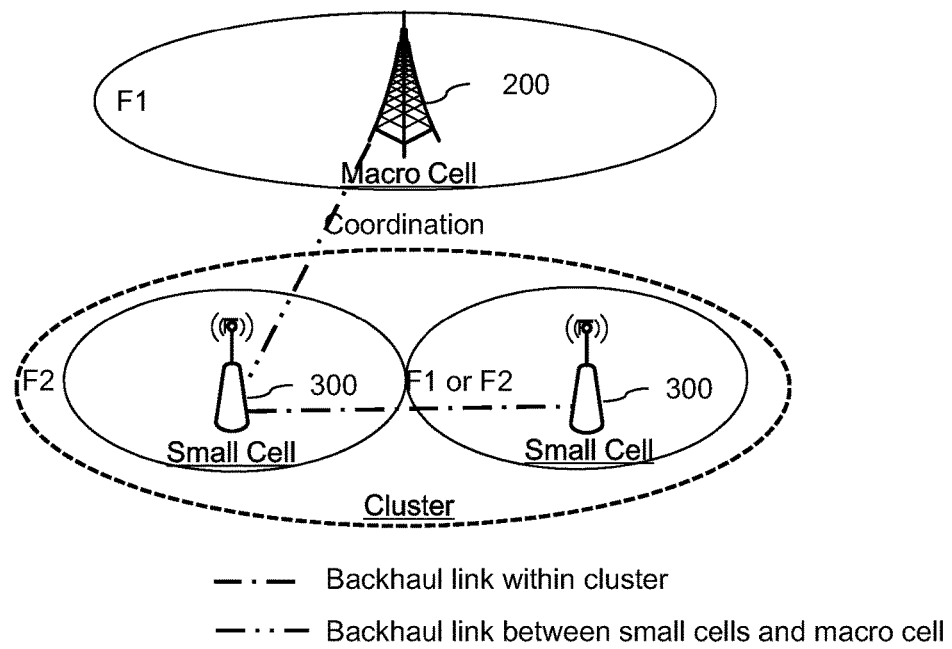
FIG. 12a shows one example of a second scenario of small cell deployment.

FIG. 12a shows one example of a second scenario of small cell deployment.

As shown in FIG. 12a, the small cells may be deployed outdoor. In such deployment, the following may be considered.

The small cells are deployed in the presence of an overlaid macro network
Separate frequency deployment of the macro cell and small cells
Outdoor small cell deployment
Small cell cluster is considered
The small cells are dense in cluster
Details regarding the number/density of small cells per cluster, backhaul link for coordination among small cells and time synchronization among small cells may also be considered.
Both ideal backhaul and non-ideal backhaul may be also considered for the following interfaces: an interface between the small cells within the same cluster and an interface between a cluster of small cells and at least one macro eNB Non-ideal backhaul is assumed for all other interfaces FIG. 12b shows another example of the second scenario of small cell deployment.

Figure 12B:
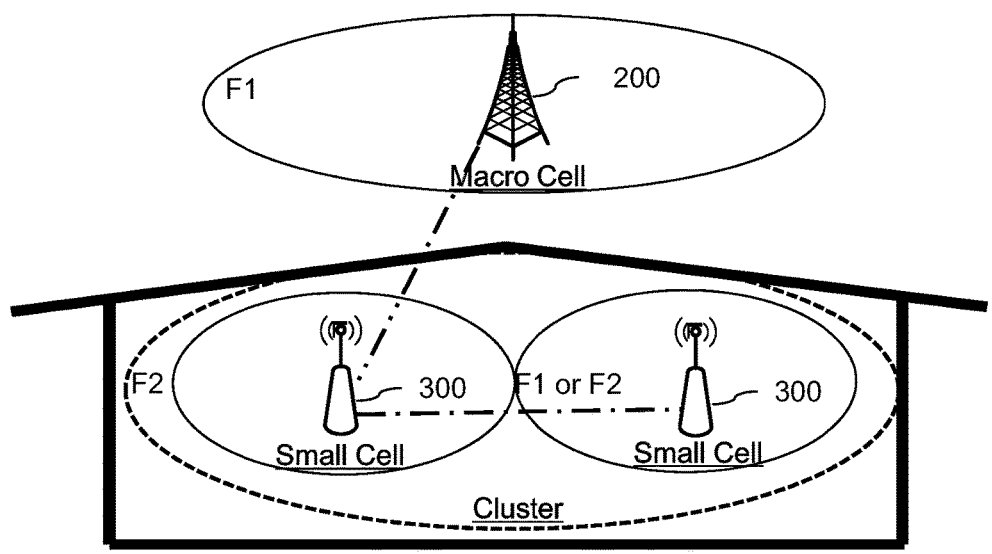
FIG. 12b shows another example of the second scenario of small cell deployment.

As shown in FIG. 12b, the small cells may be deployed indoor. In such deployment, the following may be considered.

The small cells are deployed in the presence of an overlaid macro network
Separate frequency deployment of the macro cell and small cells
Indoor small cell deployment is considered
Small cell cluster is considered
The small cells are dense in cluster
Details regarding the number/density of small cells per cluster, backhaul link for coordination among small cells and time synchronization among small cells may also be considered.

A sparse scenario can be also considered such as the indoor hotspot scenario.

Both ideal backhaul and non-ideal backhaul may be also considered for the following interfaces: an interface between the small cells within the same cluster and an interface between a cluster of small cells and at least one macro eNB Non-ideal backhaul is assumed for all other interfaces.

Figure 13:
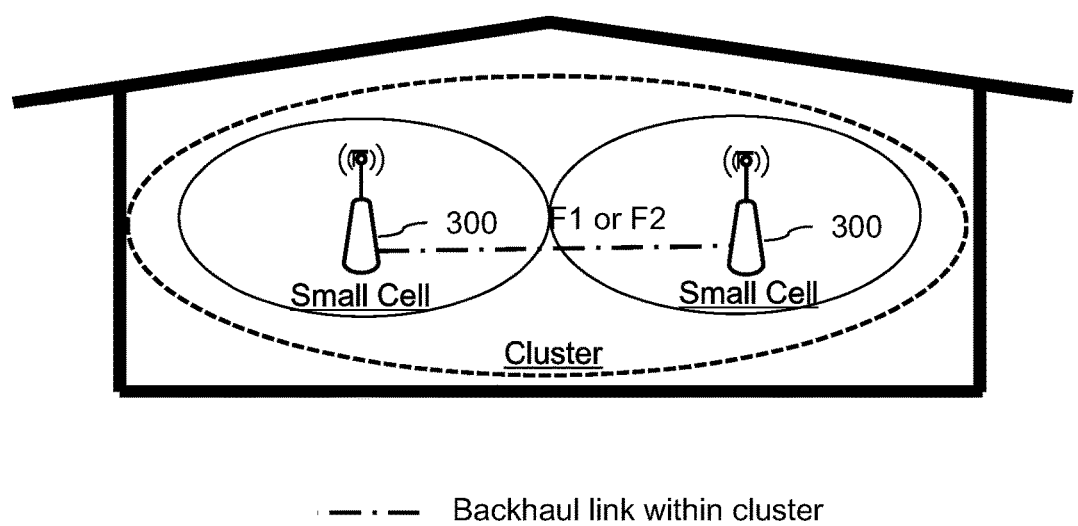
FIG. 13 shows one example of a third scenario of small cell deployment.

FIG. 13 shows one example of a third scenario of small cell deployment.

As shown in FIG. 13, the small cells may be deployed indoor. In such deployment, the following may be considered.

Macro cell coverage is not present

Indoor deployment scenario is considered

Small cell cluster is considered

The small cells are dense in cluster

Details regarding the number/density of small cells per cluster, backhaul link for coordination among small cells and time synchronization among small cells may also be considered.

A sparse scenario can be considered such as the indoor hotspot scenario.

Both ideal backhaul and non-ideal backhaul may be also considered for the following interfaces: an interface between the small cells within the same cluster.

Non-ideal backhaul is assumed for all other interfaces.

Figure 14:
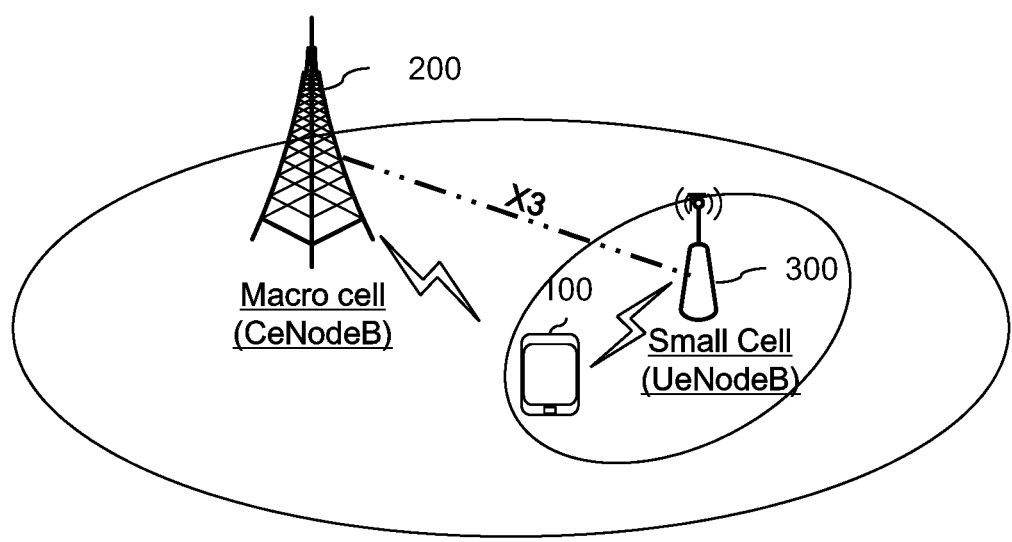
FIG. 14 shows a concept of dual connectivities

FIG. 14 shows a concept of dual connectivities

As illustrated in FIG. 14, the UE 100 has dual connectivities to both Macro cell and small cell. Here, the connectivity means the connection to eNodeB for data transfer. If the UE is served by both one macro cell and one small cell, it can be said that the UE has dual connectivities, i.e., one connectivity for the macro cell and another connectivity for the small cell. If the UE is served by small cells, it can be said that the UE has multiple connectivity.

The macro cell is served by CeNodeB (or CeNB) and the small cell or group of small cells is served by UeNodeB (or UeNB). The CeNodeB means Control plane eNodeB that is responsible for managing control plane specific operations, e.g., RRC connection control and mobility, e.g., transfer of control data on signaling radio bearers (SRBs). The UeNodeB means User plane eNodeB that is responsible for managing user plane specific operations, e.g., transfer of data on data radio bearers (DRBs).

The small cell of UeNodeB is responsible for transmitting best effort (BE) type traffic, while the macro cell of the CeNodeB is responsible for transmitting other types of traffic such as VoIP, streaming data, or signaling data.

It is noted that there is X3 interface between CeNodeB and UeNodeB that is similar to conventional X2 interface between eNodeBs.

Figure 15:
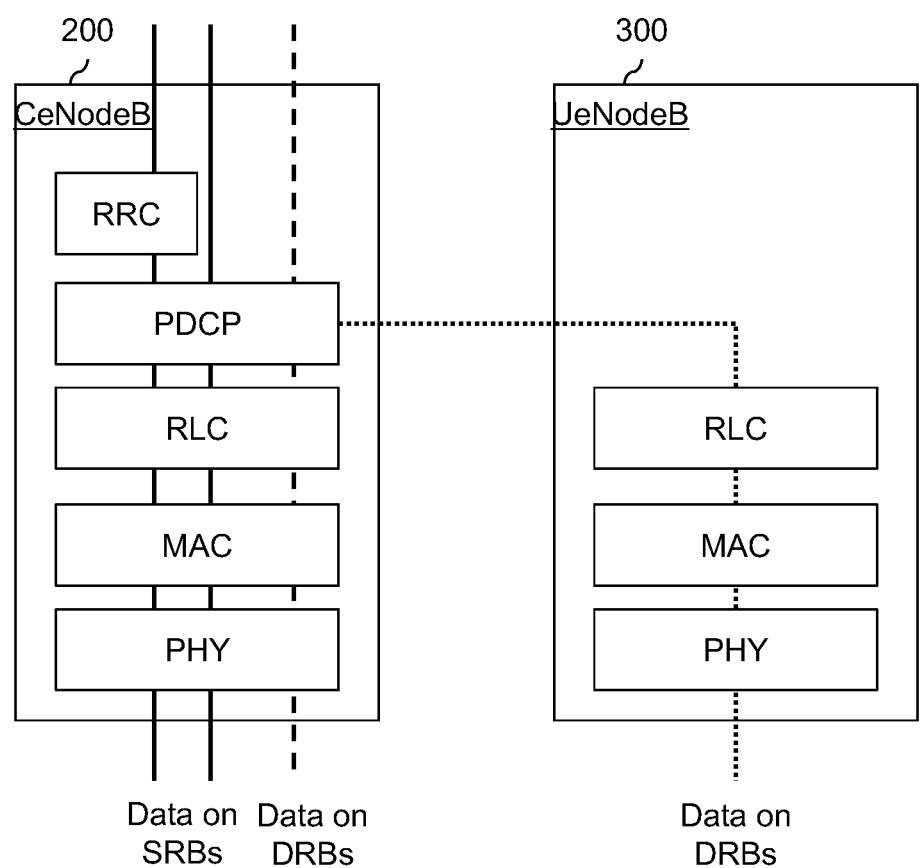
FIG. 15 shows radio protocols of eNodeBs for supporting dual connectivities.

FIG. 15 shows radio protocols of eNodeBs for supporting dual connectivities.

For dual or multiple connectivities, MAC functions of the UE 100 needs to be newly defined because from Layer 2 protocol point of view, RLC functions and configurations are bearer-specific while MAC functions and configurations are not.

To support dual or multiple connectivities, various protocol architectures are studied, and one of potential architectures is shown in FIG. 15. In this architecture, PDCP entity for UeNodeB is located in different network nodes, i.e. PDCP in CeNodeB.

As shown in FIG. 15, CeNodeB includes a PHY layer, a MAC layer, an RLC layer, a PDCH layer and an RRC layer while the UeNodeB includes a PHY layer, a MAC layer and an RLC layer. It is noted that the RRC layer and the PDCP layer exist only in the CeNodeB. In other words, there is the common RRC and PDCP layer and there is a set of RLC, MAC and PHY layers per connectivity. Accordingly, data on SRBs is signaled on CeNodeB and data on DRBs is signaled on either CeNodeB or UeNodeB according to the DRB configurations. That is, the CeNodeB can deliver data on DRBs in addition to control data on SRBs, while the UeNodeB can deliver data on only DRBs.

Here, the followings are considered:

CeNodeB and UeNodeB can be different nodes.

Transfer of data on SRBs is performed on CeNodeB.

Transfer of data on DRBs is performed on either CeNodeB or UeNodeB. Whether path of data on DRBs is on CeNodeB or UeNodeB can be configured by the eNodeB, MME, or S-GW.

There is X3 interface between CeNodeB and UeNodeB that is similar to conventional X2 interface between eNodeBs.

Because RRC connection reconfiguration is managed in the CeNodeB, the CeNodeB sends information about DRB configurations to UeNodeB via X3 interface.

Figure 16:
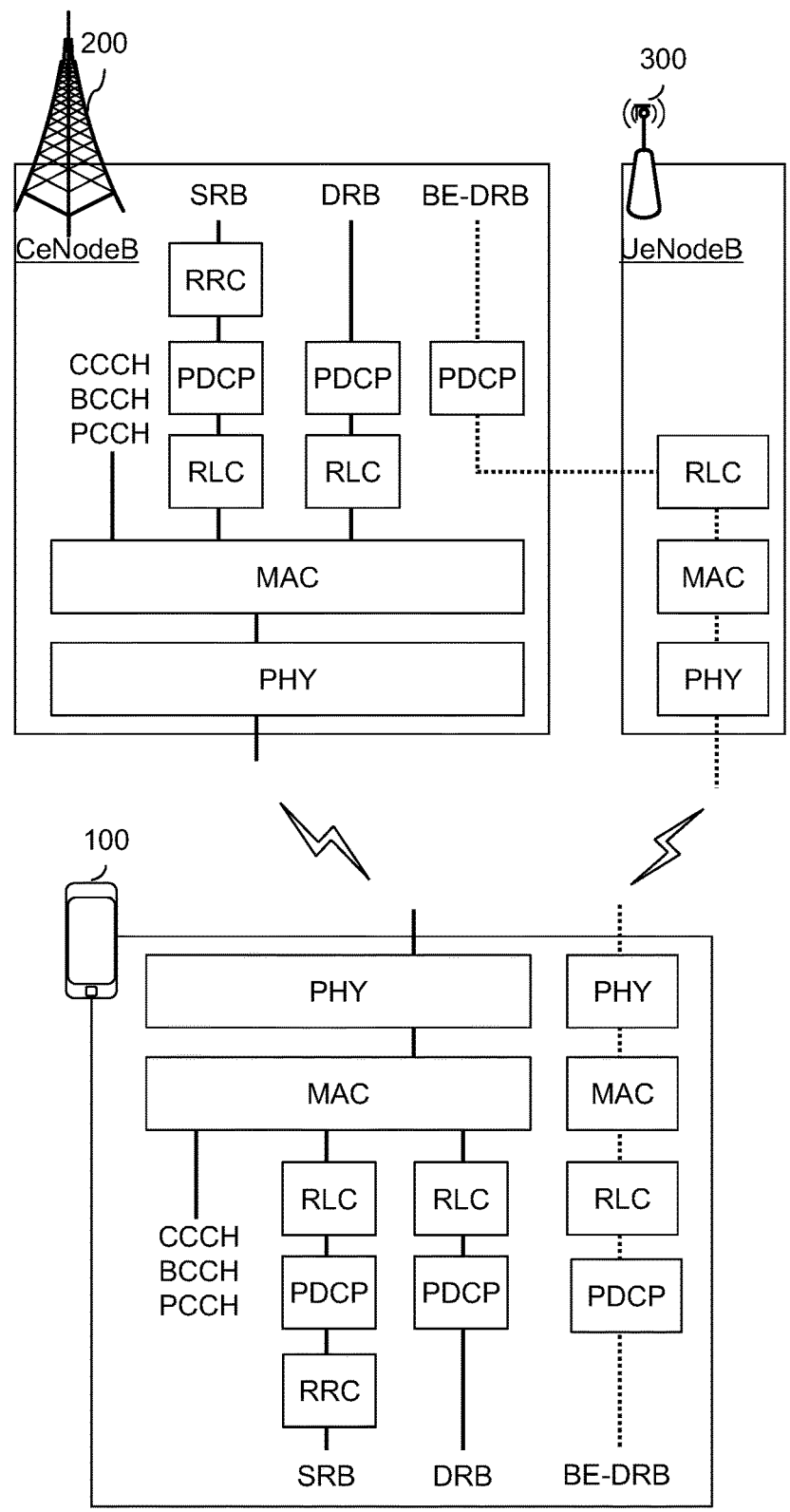
FIG. 16 shows radio protocols of UE for supporting dual connectivities.

FIG. 16 shows radio protocols of UE for supporting dual connectivities.

As shown in FIG. 16, the UeNodeB is responsible for transmitting best effort (BE) DRB. The CeNodeB is responsible for transmitting SRB and DRB. As above explained, PDCP entity for UeNodeB is located in CeNodeB.

As shown in FIG. 16, on the UE 100 side, there are plural MAC entities for macro cell of CeNodeB and small cells of UeNodeB. In other word, the UE 100 setups each MAC entity for each connectivity. Accordingly, the UE 100 includes plural MAC entities for dual or multiple connectivities. Here, although FIG. 16 illustrates two PHY entities for dual connectivities, only one PHY entity may handle dual connectivities. For the connectivity to UeNodeB, the UE 100 may include the PDCP entity, the RLC entity and the MAC entity which handle BE-DRB. For connectivity to CeNodeB, the UE 100 may include plural RLC entities, plural PDCP entities which handle SRB and DRB.

Meanwhile, each of the CeNodeB and the UeNodeB owns a radio resource for itself and include a scheduler for scheduling the radio resource for itself. Here, each scheduler and each connectivity are 1-to-1 mapping.

As such, because each scheduler schedules own radio resources, each scheduler needs to know the amount of data to schedule.

Therefore, given that there is a correspondence between the radio bearer and the connectivity, the UE reports BSR via connectivity when there is data arrival on corresponding radio bearer.

When the correspondence is changed due to removal of connectivity (i.e., the radio bearer corresponds to another connectivity), the scheduler for the connectivity that will schedule the radio bearer needs to know the data information on the radio bearer for the removed connectivity.

However, there was a problem that there is no means for BSR reporting in this case. i.e., BSR reporting is delayed until other BSR triggering conditions are met.

Therefore, the present disclosure provides a solution that that the UE can report the amount of data for connectivity if the connectivity is added, removed, or modified. It means that the UE triggers the BSR when the connectivity is added, removed or modified. In those cases, the UE sends the BSR to eNodeBs for which the configured radio bears are changed.

For the solution, the present disclosure provides one example technique. According to the technique, if the UE having connectivity to a plurality of cells receives configurations on a plurality of bearers with the plurality of cells, then the UE sets up the plurality of bearers related to connectivity to the plurality of cells based on the received configurations. Here, if at least one bearer of the bearers is changed, the UE reports the buffer status for the at least one bearer of the bearers.

On the other hand, there may be another problem where data on any radio bearer can be delay or discarded when a connectivity relating to the radio bearer is released, deactivated or disconnected.

Therefore, the present disclosure provides another solution that a connectivity to CeNodeB is considered to a default connectivity, so that the UE can associate the radio bearer related to the removed or deactivated connectivity with the default connectivity.

Figure 17:
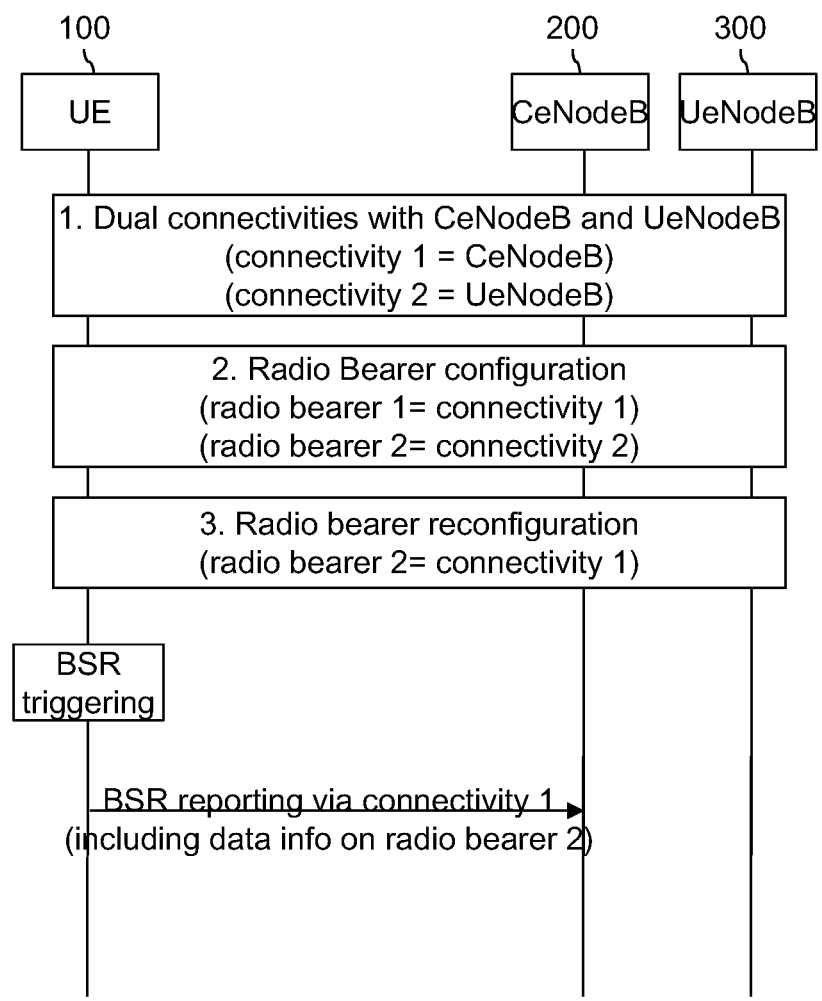
FIG. 17 shows one exemplary method according to one embodiment of the present disclosure.

FIG. 17 shows one exemplary method according to one embodiment of the present disclosure.

Referring to FIG. 17, it is illustrated how BSR is triggered and reported upon radio bearer reconfiguration.

(1) In detail, the UE 100 may receive a configuration on dual connectivites to CeNodeB (or Macro eNodeB) 200 and UeNodeB (or small eNodeB) 300. The configuration may indicate that a first connectivity (connectivity 1) is for CeNodeB and a second connected (connectivity 2) is for UeNodeB. Then, the UE 100 may activate (or configure) each MAC entity for each connectivity.

(2) And, the UE 100 may receive configuration on a plurality of bearers. The configuration may indicate that a first radio bearer (radio bearer 1) is related to or associated with the first connectivity (connectivity 1) and a second radio bearer (radio bearer 2) is related to or associated with the second connectivity (connectivity 2). Then, the UE 100 may associate (or correlate) each MAC entity for each connectivity with each radio bearer.

(3) Afterward, the UE 100 detects a change of the second radio bearer (radio bearer 2). In more detail, the UE 100 receives a reconfiguration information indicating that the association of the second radio bearer (radio bearer 2) is changed from the second connectivity (connectivity 2) to the first connectivity (connectivity 1).

(4) Then, the UE 100 triggers BSR.

(5) And, the UE 100 reports the triggered BSR including data information on the second radio bearer (radio bearer 2) the first connectivity (connectivity 1).

In such a manner, in a case where any radio bearer or any connectivity is changed, the one embodiment immediately triggers the BSR, thereby to solve a problem of a delay of the BSR.

Figure 18:
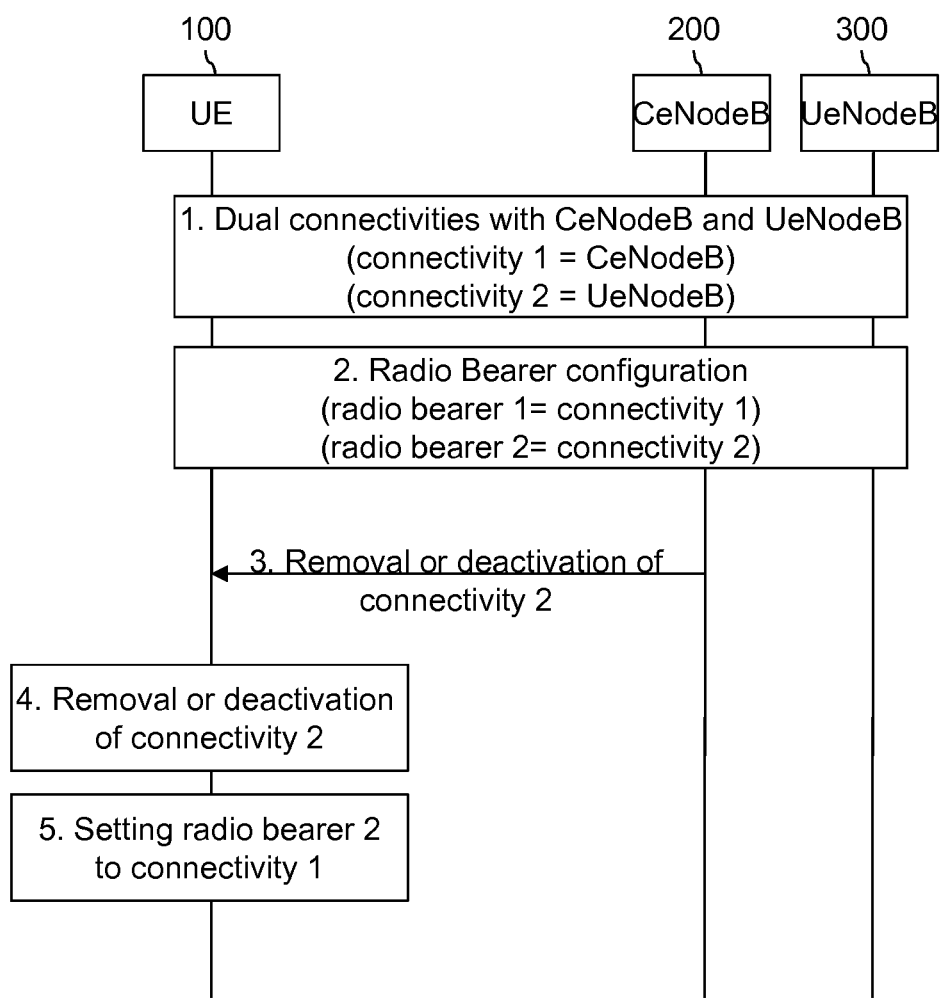
FIG. 18 shows one exemplary method according to another embodiment of the present disclosure.

FIG. 18 shows one exemplary method according to another embodiment of the present disclosure.

Referring to FIG. 18, it is illustrated how the radio bearer is reconfigured to the connectivity upon removal or deactivation of connectivity.

(1) In detail, the UE 100 may receive a configuration on dual connectivites to CeNodeB (or Macro eNodeB) 200 and UeNodeB (or small eNodeB) 300. The configuration may indicate that a first connectivity (connectivity 1) is for CeNodeB and a second connected (connectivity 2) is for UeNodeB. Then, the UE 100 may activate (or configure) each MAC entity for each connectivity. Here, the configuration on the first connectivity (connectivity 1) to CeNodeB is considered as a default configuration.

(2) And, the UE 100 may receive configuration on a plurality of bearers. The configuration may indicate that a first radio bearer (radio bearer 1) is related to the first connectivity (connectivity 1) and a second radio bearer (radio bearer 2) is related to the second connectivity (connectivity 2). Then, the UE 100 may associate (or correlate) each MAC entity for each connectivity with each radio bearer.

(3) Afterward, the UE 100 is requested to remove or deactivate the second connectivity (connectivity 2). Or, the UE 100 removes or deactivates the second connectivity (connectivity 2) by itself according to the pre-defined conditions. For example, the UE 100 can be configured with connectivity timer for each connectivity. When the UE 100 is configured with a new connectivity, the UE starts the connectivity timer for the new connectivity. If the connectivity timer expires, the UE releases the connectivity.

(4) The UE 100 sets the second radio bearer (radio bearer 2) to the first connectivity (connectivity 1) which is defined as default connectivity.

(5) Then, the UE 100 transmits or removes data both on radio bearer 1 and 2 over the first connectivity (connectivity 1).

In such a manner, if at least one connectivity is removed or deactivated, the UE can associate a radio bearer related to the at least one removed or deactivated connectivity with another connectivity. Therefore, a delay or discard of data on the radio bearer can be minimized.

Hereinafter, other embodiments of the present disclosure will be explained

<Connectivity Grouping>

For realizing dual connectivity, from UE point of view, one MAC layer is needed for each eNodeB assuming that there is one connectivity per eNodeB. Because one eNodeB serves one or more cells and cells belonging to the same eNodeB can be handed in one MAC layer, the UE has one MAC layer per connectivity. For dual connectivity, it is assumed that the UE has at least one connectivity for macro cell(s) and one or more connectivity for small cells. For example, the UE is served by one macro cell and two small cells. Those small cells are served by different UeNodeBs. Then, the UE has 3 connectivity that requires 3 MAC layers.

The connectivity management can be done by CeNodeB, MME or S-GW. The following is included in the connectivity management.

Connectivity identifier (Id)

The UE can be configured with connectivity Id for each connectivity by e.g., RRC messages. For example, the UE can be configured with connectivity Id 0 for CeNodeB, connectivity Id 1 for UeNodeB1, and connectivity Id 2 for UeNodeB2. The connectivity Id is generally used for identification of connectivity between the UE and eNodeB, e.g., when the connectivity is added, modified or removed.

Configuration per connectivity

With connectivity grouping, the common configuration for cells belonging to the same connectivity can be provided to the UE. For example, if the configurations are provided with the connectivity Id, the UE applies the configurations to the cells belonging to the connectivity indicated by the connectivity Id.

Default configuration for connectivity

Configurations for the connectivity for CeNodeB are considered as fault configuration. So, if the connectivity is removed, default configuration is applied to the configuration including radio bearer configured for the removed connectivity. For example, the UE is configured with radio bearers A and B and radio bearer A is configured for CeNodeB (connectivity 1) and radio bearer B is configured for UeNodeB (connectivity 2). If the connectivity 2 is removed, the UE considers the radio bearer B to be configured for connectivity 1.

Connectivity timer

The UE can be configured with connectivity timer for each connectivity. When the UE is configured with a new connectivity, the UE starts the connectivity timer for the new connectivity. The UE re-starts the connectivity timer if the connectivity is modified. If the connectivity timer expires, the UE releases the connectivity.

Activation/deactivation of the connectivity

The eNodeB (e.g., CeNodeB) may order the UE to activate or deactivate one, some, all connectivity. When a new connectivity is added to the UE, the UE consider the connectivity to be deactivated. When the eNodeB asks the UE to activate the connectivity by PDCCH, MAC, RLC, PDCP, RRC signaling, the UE activates the connectivity. For the activated connectivity, the UE can use the data transfer on it. If the eNodeB asks the UE to deactivate the connectivity, then, the UE deactivates the connectivity. For the deactivated connectivity, the UE cannot use the data transfer on it.

<Buffer Status Reporting (BSR)>

Because the scheduler in each eNodeB schedules own radio resources, each scheduler needs to know the amount of data to schedule.

However, existing BSR mechanism only allows the UE to report the amount of data per logical cannel group (LCG) in one message to one eNodeB. It implies that the information about buffer status would need to be exchanged between the eNodeBs that are subject to dual connectivity. So, there would be a delay for the eNodeB to schedule.

Therefore, it is proposed that the BSR procedure is performed per connectivity. That is, radio bearers configured for a connectivity are considered for the BSR procedure for the connectivity. For example, it is assumed that the UE has 2 connectivity (connectivity 1 and 2) and 2 sets of radio bearers (set A and B). It is further assumed that set A is used for connectivity 1 and set B is used for connectivity 2. In this case, the BSR procedure for connectivity 1 is associated with the data on radio bearers in set A and the BSR procedure for connectivity 2 is associated with the data on radio bearers in set B. So, If data on radio bears in set A arrives, The UE triggers the BSR for the connectivity 1. It means that the UE reports the BSR (i.e., BSR MAC CE) to the eNodeB which is subject to the connectivity 1. Also, if the UE does not have UL resources, then the UE triggers SR for the connectivity 1. It means that the UE sends SR on PUCCH or performs the Random Access procedure to/on the eNodeB which is subject to the connectivity 1. The BSR MAC CE includes information only about buffer status of radio bearers in set A.

If data on radio bears in set B arrives,

The UE triggers the BSR for the connectivity 2. It means that the UE reports the BSR (i.e., BSR MAC CE) to the eNodeB which is subject to the connectivity 2. Also, if the UE does not have UL resources, then the UE triggers SR for the connectivity 2. It means that the UE sends SR on PUCCH or performs the Random Access procedure to/on the eNodeB which is subject to the connectivity 2. The BSR MAC CE includes information only about buffer status of radio bearers in set B.

Also, BSR configurations including periodicBSR-Timer, retxBSR-Timer and so on can be configured per connectivity. In addition to BSR configurations, those timers operate on each connectivity.

eNodeB may want to know total amount of UE's data (in UL). In this case, eNodeB can order the UE to report the total amount of data in UL. This order can be signaled by the PDCCH, MAC, RLC, PDCP, or RRC signaling. Also, eNodeB can configure the UE with periodic timer for reporting total amount of data in UL. The total amount of data can be indicated by amount of data per LCG, amount data per logical channel, amount of data per connectivity or etc.

Also, the UE can report the amount of data for connectivity if the connectivity is added, removed or modified. It means that the UE triggers the BSR when the connectivity is added, removed or modified. In those cases, the UE sends the BSR to eNodeBs for which the configured radio bears are changed. For example, the UE has two radio bears (A and B) for connectivity 1. If the UE is configured with a new connectivity 2 and radio bearer B is configured for connectivity 2, then the UE triggers the BSR for connectivity 2 and sends the BSR to the eNodeB which is subject to the connectivity 2, including the amount of data on radio bear B. Also, the UE triggers the BSR for connectivity 1 and sends it to the eNodeB which is subject to the connectivity 1, including the amount of data on radio bears on radio bear A.

If the connectivity is removed, the UE triggers the BSR and sends it to the CeNodeB (or other UeNodeBs) to indicate the amount of data for radio bears configured for the removed connectivity.

When the amount of data on radio bears configured for connectivity is indicated, the connectivity id can be indicated together to identify the connectivity. For example, when the UE report BSR for connectivity 1, then the UE also indicates connectivity id assigned for connectivity 1 along with the BSR.

<Logical Channel Prioritization (LCP)>

When the UE receives the UL grant from the eNodeB which is subject to certain connectivity, during the LCP procedure, the data on radio bearers configured and/or control information for the connectivity is only considered. For example, if the UE has 2 connectivity (A and B) and radio bearer "a" is configured for connectivity A and radio bearer "b" is configured for connectivity B, when the UE receives the UL grant from the eNodeB which is subject to the connectivity A, then the data on radio bearer "a" is considered for generating the MAC PDU by the received UL grant. I.e., in LCP procedure, the UL grant is only applicable to the data on radio bearers configured for connectivity for which the UL grant is assigned.

<Power Headroom Reporting (PHR)>

The PHR configurations per connectivity can be provided to the UE. Also, PHR related timers can operate per connectivity.

If the UE triggers PHR, it sends the PHR MAC CE. The PHR MAC CE includes the PH of cells belonging to the same connectivity.

When the connectivity is added, removed, or modified, the UE triggers the PHR for one, some, or all the configured connectivity.

When the UE reports the PHs for connectivity, the UE can indicate the connectivity Id.

<Maintenance of Uplink Timing Alignment>

Configuration about uplink timing alignment per connectivity can be provided to the UE. Uplink timing alignment related timer (e.g., timeAlignmentTimer) can operate per connectivity.

When the timeAlignmentTimer for connectivity for CeNodeB expires, the UE considers timeAlignmentTimer for all connectivity as expired.

When the Timing Advance Command is indicated, the connectivity Id is also indicated. Then, the UE applies the Timing Advance Command for the connectivity indicated by the connectivity Id and starts the timeAlignmentTimer for the connectivity indicated by the connectivity Id <Random Access Procedure>

The Random Access procedure is also performed per connectivity. If the Random Access procedure needs to be performed at the same time on 2 or more connectivity, the UE prioritizes the Random Access procedure on the connectivity of the CeNodeB over connectivity of the UeNodeBs.

The ways or methods to solve the problem of the related art according to the present disclosure, as described so far, can be implemented by hardware or software, or any combination thereof.

Figure 19:
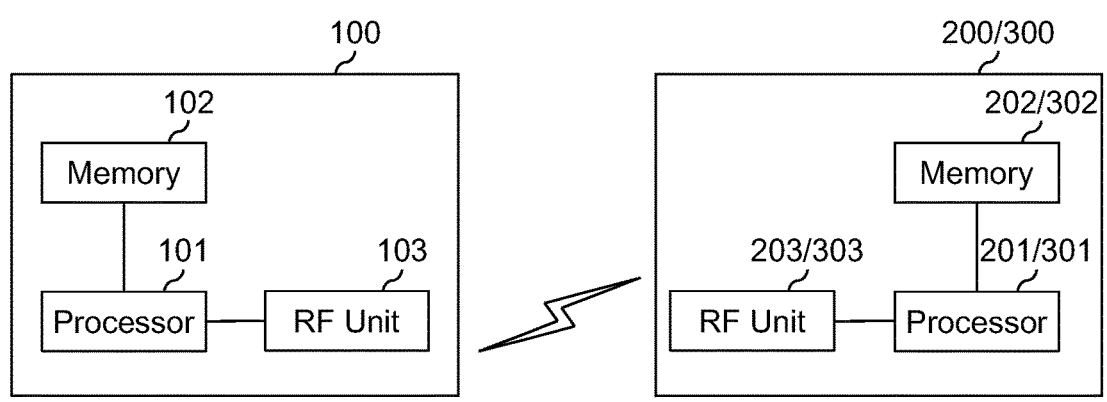
FIG. 19 is a block diagram showing a wireless communication system to implement an embodiment of the present invention.

FIG. 19 is a block diagram showing a wireless communication system to implement an embodiment of the present invention.

An UE 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the UE may be implemented by the processor 101.

The eNodeB (including CeNodeB and UeNodeB) 200/300 includes a processor 201/301, memory 202/302, and an RF unit 203/303. The memory 202/302 is connected to the processor 201/301 and configured to store various information used for the operations for the processor 201/301. The RF unit 203/303 is connected to the processor 201/301 and configured to send and/or receive a radio signal. The processor 201/301 implements the proposed functions, processed, and/or methods. In the described embodiments, the operation of the eNodeB may be implemented by the processor 201.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting buffer status, comprising:
receiving a connectivity configuration on dual connectivities to a first base station and a second base station, the connectivity configuration indicates that a first connectivity of the dual connectivities is related to the first base station and a second connected of the dual connectivities is related to the second base station;
receiving a bearer configuration, the bearer configuration indicates that a first bearer is associated with the first connectivity and a second bearer is associated with the second connectivity;
identifying a change of a radio bearer,
wherein the identifying the change of the radio bearer comprises receiving a reconfiguration information indicating that an association of the second radio bearer is changed from the second connectivity to the first connectivity; and
triggering a buffer status report (BSR), if the association of the second radio bearer is changed from the second connectivity to the first connectivity.

2. The method of claim 1, further comprising:
connecting with the first base station via a first MAC entity; and
connecting with the second base station via a second MAC entity.

3. The method of claim 2, wherein the radio bearer is served by the first MAC entity.

4. The method of claim 3,
wherein the identifying the change of radio bearer comprises:
identifying whether the radio bearer is changed to be served by the second MAC entity or to be served by both the first and second MAC entities.

5. The method of claim 2, wherein the radio bearer is served by both the first and second MAC entities.

6. The method of claim 5,
wherein the identifying the change of radio bearer comprises:
identifying whether the radio bearer is changed to be served by the second MAC entity.

7. The method of claim 2, wherein the triggering the BSR comprises:
triggering, by the second MAC entity, the BSR.

8. The method of claim 7, wherein the BSR is for the second base station.

9. The method of claim 7, wherein the triggering the BSR further comprises:
triggering, by the first MAC entity, the BSR.

10. The method of claim 9, wherein the BSR is for the first base station.

11. The method of claim 2, wherein the connecting with the first base station includes:
connecting, by the first MAC entity, with a first cell of the first base station; and
connecting, by the first MAC entity, with a second cell of the first base station.

12. The method of claim 2, wherein the connecting with the second base station includes:
connecting, by the second MAC entity, with a first cell of the second base station; and
connecting, by the second MAC entity, with a second cell of the second base station.

13. The method of claim 2, wherein
if the first base station operates a plurality of cells, the first MAC entity handles the plurality of cells; and if the second base station operates a plurality of cells, the second MAC entity handles the plurality of cells.

14. A communication device configured for reporting buffer status, the communication device comprising:
a radio frequency (RF) unit; and
a processor connected with the RF unit thereby to control to:
receive a connectivity configuration on dual connectivities to a first base station and a second base station, the connectivity configuration indicates that a first connectivity of the dual connectivities is related to the first base station and a second connected of the dual connectivities is related to the second base station;
receive a bearer configuration, the bearer configuration indicates that a first bearer is associated with the first connectivity and a second bearer is associated with the second connectivity;
identify a change of a radio bearer,
wherein the change of the radio bearer indicates that an association of the second radio bearer is changed from the second connectivity to the first connectivity; and
trigger a buffer status report (BSR), if the association of the second radio bearer is changed from the second connectivity to the first connectivity.

15. The communication device of claim 14, wherein the RF unit is configured to
connect with the first base station via a first MAC entity; and
connect with the second base station via a second MAC entity.

16. The communication device of claim 15, wherein the radio bearer is served by the first MAC entity.

17. The communication device of claim 15, wherein the processor is configured to:
identify whether the radio bearer is changed to be served by the second MAC entity or to be served by both the first and second MAC entities.

* * * * *